United States Patent [19]
Pontius

[11] Patent Number: 5,619,371
[45] Date of Patent: Apr. 8, 1997

[54] CONFOCAL OPTICAL MICROSCOPY SYSTEM FOR MULTI-LAYER DATA STORAGE AND RETRIEVAL

[75] Inventor: Duane H. Pontius, Gardendale, Ala.

[73] Assignee: Southern Research Institute, Birmingham, Ala.

[21] Appl. No.: 397,364

[22] Filed: Mar. 2, 1995

[51] Int. Cl.$^6$ .................................................. G02B 21/00
[52] U.S. Cl. ................................................ 359/368; 369/94
[58] Field of Search ............................. 359/368; 369/59, 369/94, 112, 272

[56] References Cited

U.S. PATENT DOCUMENTS

| | | |
|---|---|---|
| 4,686,662 | 8/1987 | Baer . |
| 4,982,397 | 1/1991 | Yokota . |
| 5,115,420 | 5/1992 | Finkelstein et al. . |
| 5,247,510 | 9/1993 | Lee et al. . |
| 5,291,269 | 3/1994 | Ledger . |
| 5,293,214 | 3/1994 | Ledger . |
| 5,349,471 | 9/1994 | Morris et al. . |
| 5,487,060 | 1/1996 | Rosen et al. ............... 369/118 |

FOREIGN PATENT DOCUMENTS 2184321  6/1987  United Kingdom .

OTHER PUBLICATIONS

"More Bits from Pits", John Horgan et al., *Scientific American*, Aug. 1994, pp. 87–88.

"Confocal Microscopy", Jeff W. Lichtman, *Scientific American*, Aug. 1994, pp. 40–45.

"IBM Pushing Multilevel Optical Disk" IBM Almaden, San Jose, Calif., *R & D Magazine*, Aug. 1994, p. 9.

Primary Examiner—Timothy P. Callahan
Assistant Examiner—Jeffrey Zweizig
Attorney, Agent, or Firm—Pollock, Vande Sande & Priddy

[57] ABSTRACT

A confocal optical microscopy system for storing and retrieving optical information recorded in multiple layers in an optical disk. The invention includes a system utilizing the principle of confocal optical microscopy for accurately focusing a light beam onto a plane of a layer within a multi-layer disk. Optical information is thereby retrieved from the layer within the multi-layer disk. The invention also includes a method for recording optical data onto the multi-layer disk which comprises stacked multiple layers of transparent material having a distribution of discrete areas of metal film deposited between the layers. The distribution of metal film represents the recorded optical information.

13 Claims, 5 Drawing Sheets

FIG. 4H

CONFOCAL OPTICAL MICROSCOPY SYSTEM FOR MULTI-LAYER DATA STORAGE AND RETRIEVAL

FIELD OF THE INVENTION

The invention relates to optical systems, and in particular to a confocal optical microscopy system for storing and retrieving optical information stored in multiple layers in an optical disk.

BACKGROUND OF THE INVENTION

Optical methods for data storage and retrieval are in widespread use in computer technology, as well as audio and video recording. Among the various descriptive terms used to describe the present state of the art are CD (Compact Disk), Laser Disk, and CD-ROM (Compact Disk Read Only Memory).

Optical disks store data in the form of small oblong pits that cause fluctuations in the brightness of a laser beam illuminating a surface of the disk. Arrays of microscopic, optically distinct regions form tracks or sectors located on the background material supporting these tracks. These tracks are arranged to represent a sequence of digital data. The data is read or retrieved from the disk by illuminating the region of interest with the light of a laser focused on individual regions in a specific sequence. The difference between reflected or transmitted light is discerned by an optical detector. These light fluctuations are then converted into a stream of ones and zeros, and thus into information that the user receives as numerical data, which may be further interpreted as text, image, sound, or a combination of the three.

Various approaches have been taken to increase the density of data storage on the disk. Some of these approaches are described in U.S. Pat. No. 5,247,510 entitled "Increasing Storage Density of Optical Data Media by Detecting a Selected Portion of a light Spot Image Corresponding to a Single Domain," and U.S. Pat. No. 5,161,134 entitled "Method For Increasing Linear Density In Magneto Optical Storage Media." As revealed in these patents, an increase in density of optical data storage has depended mainly on improvements in the resolution of the hardware for locating and distinguishing among closely spaced variations in a two-dimensional distribution of marks. These techniques permit closer spacing of the data-bearing indicia thus increasing the density of the storage medium.

Dealing with a two-dimensional storage medium, such as a conventional compact disk, the above approaches are ultimately limited by the two-dimensional surface area of the medium, despite the improvements in the resolution of the optical hardware.

OBJECTS OF THE INVENTION

It is therefore an object of the invention to achieve a multifold increase in the density of the optical data storage medium.

it is another object of the invention to provide a system for retrieving information from the increased density optical data storage medium.

It is yet another object of the invention to provide a method for increasing data density for an optical data storage medium.

SUMMARY OF THE INVENTION

A confocal optical microscopy system is disclosed for storing and retrieving optical data from a multi-layer data medium, such as a multi-layer optically read disk.

In accordance with the invention, the multi-layer optically read disk has a plurality of adjacent identical layers which are located on the supporting material. Each layer covers the same two-dimensional surface area as the supporting material. The layers are made of substantially transparent material and have a flat surface on one side. Each layer is covered by a distribution of small, discrete areas of metal film which comprises optical information recorded on it from a data template, for example. The stacking layers and the supporting material form a multi-layer disk having optical information recorded on each layer.

Further according to the invention, when data is retrieved from the multi-layer disk, a light source, such as a laser, emits a coherent light beam for illuminating a sensing location, a bit, on a layer of the multi-layer disk containing optical information. The sensing location can be located on any layer within the multilayer disk. Next, using the principle of confocal microscopy, illuminating optics focus the coherent light beam onto a single plane which carries the data coincident with the layer in the multi-layer disk. The light beam is then either absorbed or reflected from the sensing location of the layer, depending on the data recorded in the sensing location. If the light beam is reflected, the optical information carried by the coherent light beam is processed by the imaging optics using the principle of confocal microscopy. According to this principle, only those light rays which emanate from the plane of the sensing location are passed to a photodetector for conversion into an electrical signal representing binary data. A digital signal processor then processes the binary data for subsequent display.

The use of confocal microscopy permits data to be read from any single layer of a multiple layer optical disk. Thus, the data storage capacity is increased by multiplying the number of databearing layers in the optical medium.

Further disclosed is a multi-layer disk for use in a confocal optical microscopy retrieval system, as well as a method for making such a multi-layer disk. A layer of an optically transparent material is deposited onto a support material having at least one substantially flat surface. A metal film is then placed on the flat surface of the support material. Optical data is recorded onto the metal film from a data template, while the non-data areas are etched away from the layer. A second layer of the transparent material is placed on top of the first layer. A metal film is then deposited onto the second layer. Next, optical data is transferred from another data template onto the metal film. The non-data portions are stripped away exposing the underlying transparent material of the layer. The process is repeated with subsequent layers stacked on top of each other, resulting in each layer holding optical data in a three-dimensional data disk.

DESCRIPTION OF THE PREFERRED EMBODIMENT

Figure 1:
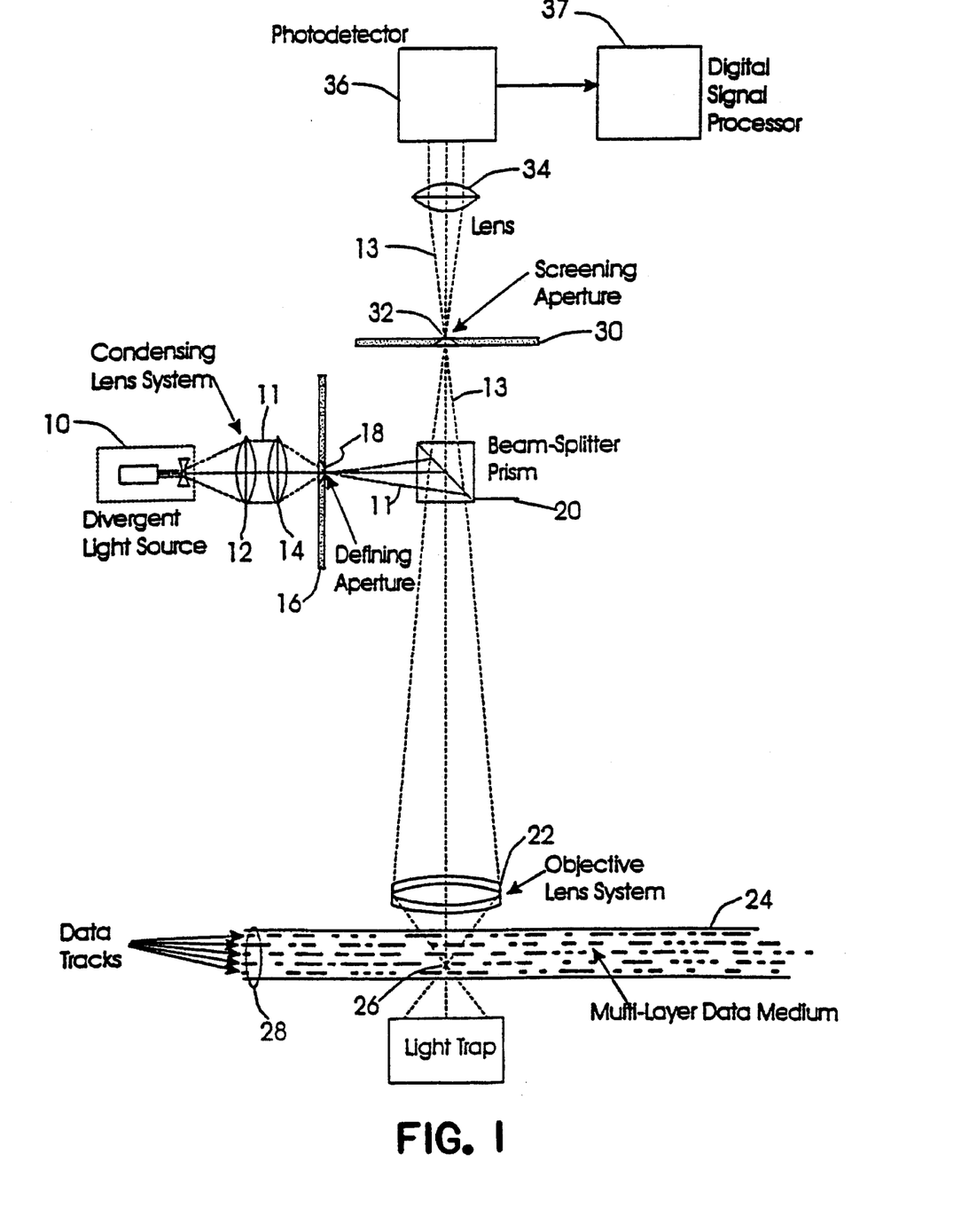
FIG. 1 is a schematic diagram of a confocal optical microscopy system for use with a multi-layer data medium during a data retrieving operation.

FIG. 1 illustrates a schematic arrangement of the elements in the confocal optical microscopy system during a data retrieving operation. First, an illuminating section of the system is described which comprises a light source 10, two convex lenses 12 and 14, a first plate 16 with a pinhole aperture 18, a beam-splitter prism 20 and an objective lens 22.

The diverging light source 10, preferably a laser, produces a first coherent light beam 11 to illuminate a multi-layer data medium, such as a multi-layer disk 24. The first coherent light beam 11, emanating from the light source 10, broadly diverges from its point of origination. Two convex lenses 12 and 14, placed in an optical path of the first coherent light beam 11, focus the diverging first coherent light beam 11 to a small focal point. The first plate 16, having its two parallel surfaces perpendicularly positioned in the optical path of the first coherent light beam 11, is placed in the plane of the focal point of the lens 12 and 14. The pinhole aperture 18 of the first plate 16 is positioned at the focal point of the convex lens 12 and 14. The first coherent light beam 11 passes through the pinhole aperture 18 and diverges to the beam-splitter prism 20. The beam-splitter prism 20 orthogonally redirects the first coherent light beam 11 in the direction of the multi-layer disk 24, and distinguishes between the reflected rays and incident rays of the first coherent light beam 11.

The orthogonally redirected diverging first coherent light beam 11 is collected by the objective lens 22. The objective lens 22 focuses the first coherent light beam 11 onto a plane of a layer in the multi-layer disk 24 having data optically encoded thereon. The layers are stacked on top of each other, having their surfaces positioned perpendicular to the first coherent light beam 11. The objective lens 22 converges the first coherent light beam 11 to a focal point onto a small information carrying sensing location 26, containing a data bit on the surface of a layer of the multi-layer disk 24. The multi-layer disk 24 is composed of multiple layers containing different recorded digital information, which is arranged in concentric sectors 28 on each layer.

In this particular example, binary "1" is represented by the sensing location 26 which is reflective, and binary "0" by the sensing location 26 which is transparent. It is understood, of course, that the representation of binary "1" and binary "0" can be reversed, i.e., binary "1" being represented by the transparent surface of the bits and binary "0" by the reflective surface.

Next, continuing with the description of the read operation at the point where the first coherent light beam 11 strikes the plane of the layer, an imaging section of the system is described. The imaging section comprises the objective lens 22, the beam-splitter prism 20, a second plate 30 with a pinhole aperture 32, a collimator lens 34, and a photodetector 36.

Thus, as the first coherent light beam 11 focused by the objective lens 22 is reflected from the sensing location 26 on the layer within the multi-layer disk 24, the second coherent light beam 13 is returned back to the objective lens 22. The objective lens 22 converges the second coherent light beam 13, reflected from the sensing location 26 of the multi-layer disk 24, to a focal point through the beam-splitter prism 20. The second plate 30 has its two parallel surfaces perpendicularly positioned in the optical path of the second coherent light beam 13. Light, which is reflected from the sensing location 26, is focused by the objective lens 22 on the pinhole aperture 32. As the second coherent light beam 13 converges to the focal point, only those rays reflected from the sensing location 26 are passed through the pinhole aperture 32, thus filtering the second coherent light beam 13 to remove the rays which emanate from a plane above or below the sensing location 26. Thus, only information carrying rays, reflected from the sensing location 26, pass through the pinhole aperture 32, while the rays reflected from the bits on other layers are substantially blocked by the second plate 30.

After being filtered through the pinhole aperture 32, the second coherent light beam 13 passes through the collimator lens 34. The collimator lens 34 shapes the second coherent light beam into one having a substantially uniform diameter over its entire length. The photodetector 36 converts the collimated second coherent light beam 13, carrying optical information recorded on the layer, into an electrical signal which represents binary data. A digital signal processor 37, which is electrically coupled to the photodetector 36, processes the binary data for subsequent operations, such as a visual display or an audio equipment.

The disclosed approach to the data retrieval utilizes a technique known as confocal optical microscopy to improve both the resolution and the signal-to-noise ratio in retrieving data from the multi-layer disk 24. The general principle of confocal optical microscopy is based on using the same objective lens 22 for both illuminating and imaging a specific localized region. Since all of the light in a broad cone is focused on the point of interest, modulations in optical properties above that point are averaged out, and the illumination at the focus is strongly peaked.

The principal of confocal microscopy achieves high resolution of a selected plane within the multi-layer disk 24 by focusing the first coherent light beam 11 via the objective lens 22 into a cone shaped first coherent light beam 11. At the vertex of the cone shaped first coherent light beam 11, i.e., the focal point of the objective lens 22, the first coherent light beam 11 strikes one spot at some chosen depth within the multi-layer disk 24. The second coherent light beam 13 reflected from that spot is focused by the objective lens 22 to another focal point on the other side of the objective lens 22 from the multi-layer disk 24. The pinhole aperture 32 is located at this focal point to filter the reflected rays.

The pinhole aperture 18 near the light source 10 is an exact complement of another pinhole aperture 32, which rejects unwanted rays of the second coherent light beam 13, in the plane of the multi-layer disk 24 near the photodetector 36. The distance from the pinhole aperture 18 to the sensing location 26, via the beam-splitter prism 20 and the objective lens 22, equals the distance from the pinhole aperture 32 to the sensing location 26, via the beam-splitter prism 20 and the objective lens 22. This complementary configuration allows only the rays of the second coherent light beam 13 to pass in substantially its entirety through the pinhole aperture 32 in the second plate 30 positioned in front of the photodetector 36. The opaque regions around the pinhole aperture 32 block out most of the rays reflected by illuminated layers of the multi-layer disk 24 lying above and below the plane of interest that would tend to obscure the resulting image.

Thus, in accordance with the principle of confocal microscopy, the complementary apertures 18 and 32 in the illumination and imaging sections, respectively, reject spurious light rays. Furthermore, since the imaging section of the confocal optical microscopy system employs the same objective lens 22 as the illuminating section, the bits in the multi-layer disk 24 outside the region of interest are not only out of focus, but also weakly illuminated. Undesirable signals are therefore strongly rejected. It has been shown that resolution of the order of 10 μm normal to the focal plane of the objective lens 22 is readily achievable by confocal microscopy with ordinary white light illumination.

Figure 2A:
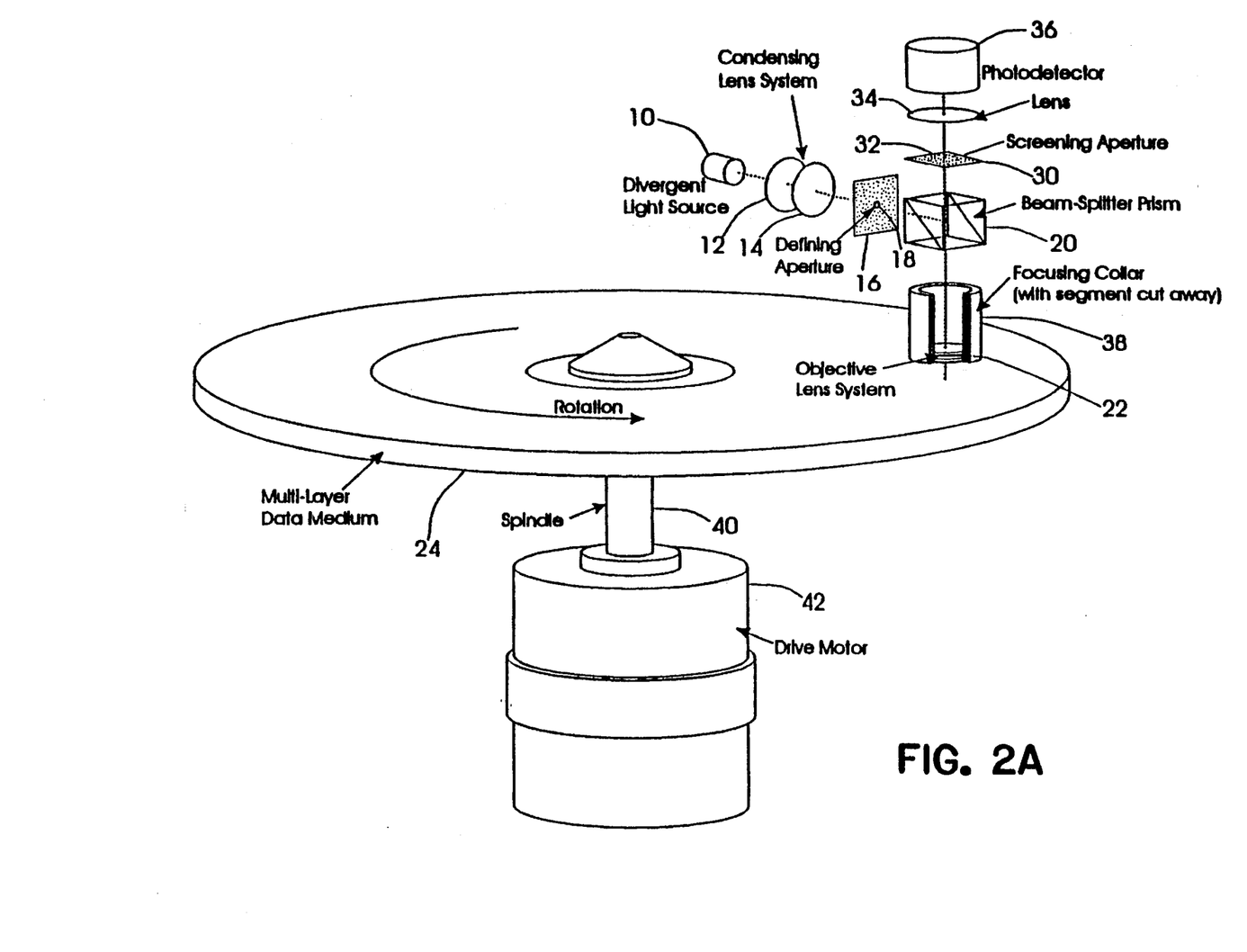
FIG. 2A is an illustration of a confocal optical microscopy system for use with a multi-layer data medium during a data retrieving operation.

The confocal optical microscopy system selects the plane of the layer by adjusting the focus of the objective lens 22. FIG. 2A illustrates the confocal optical microscopy system for use with the multi-layer disk 24 during the data retrieving operation. Identical numerals in all Figures represent the same elements of the invention. Selection of a particular layer is achieved by moving the objective lens 22 normal to the plane of the multi-layer disk 24. Since the individual layers are of the order of 10 μm apart, the focus adjustments are quite fine and require only minimal movement. FIG. 2A shows a focusing collar 38 with a cutaway portion. The focusing collar 38 is shaped as a cylinder without top and bottom bases which passes the first and second coherent light beams 11 and 13. The cylindrically shaped focusing collar 38 encloses the coaxially disposed objective lens 22. The objective lens 22 slides along the axis of the focusing collar 38 to focus the first coherent light beam 11 onto the plane of a layer within the multi-layer disk 24. By sliding the objective lens 22 along the axis of the focusing collar 38, the first coherent light beam 11 is focused on different parallel layers within the multi-layer disk 24 achieving high resolution of the data. Since the movement of the objective lens 22 is on the order of micrometers, a sensitive piezoelectric sensor or other transducer means can be used for displacing the objective lens 22 along the axis of the focusing collar 38 in response to an electrical signal.

Figure 2B:
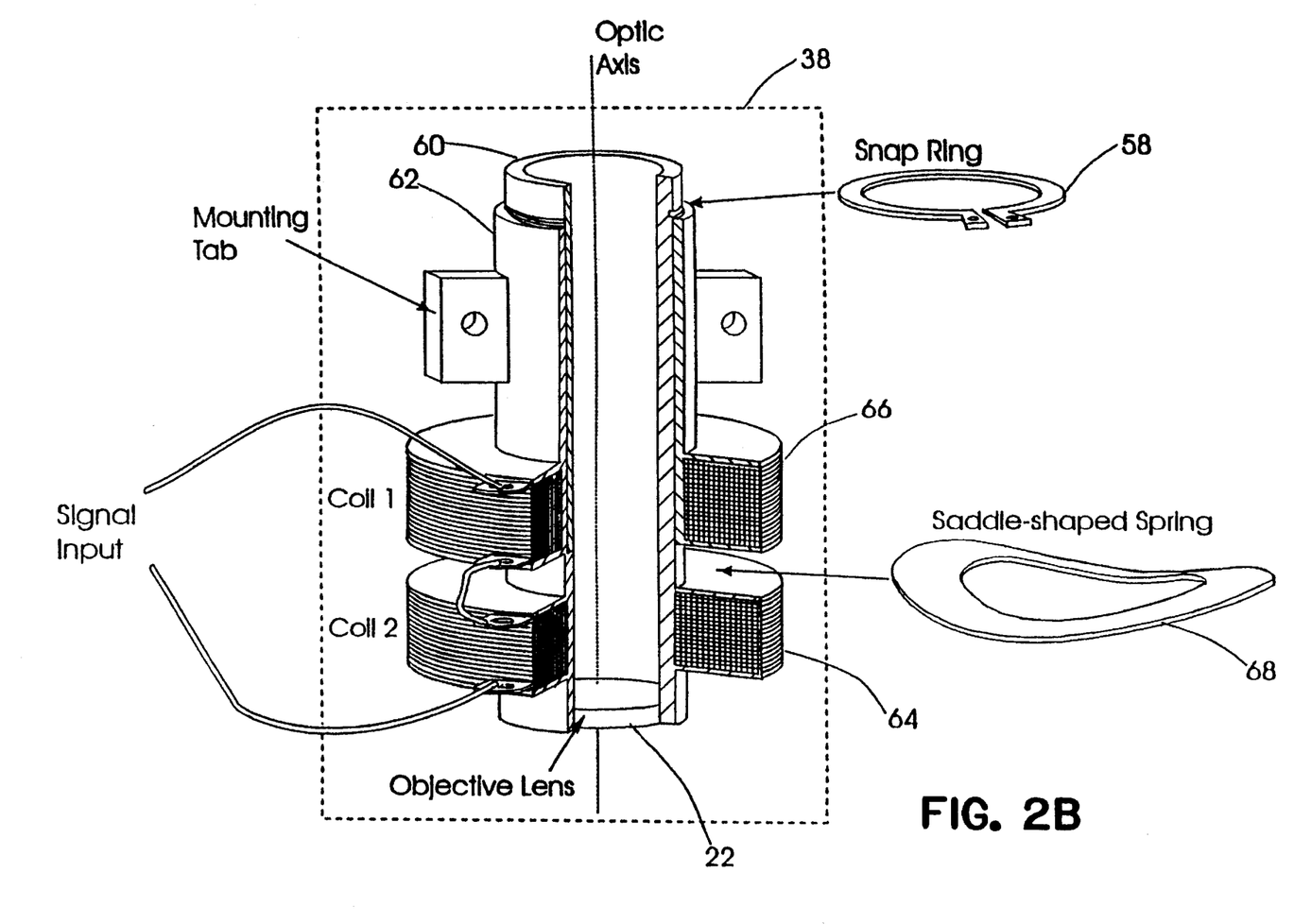
FIG. 2B is an illustration of an apparatus for changing the focal point of an objective lens 22.

FIG. 2B is an illustration of one implementation of an apparatus for changing the focal point of the objective lens 22. The focusing collar 38 comprises two concentric cylinders 60 and 62, where the inner cylinder 60 slides freely inside the outer cylinder 62. Each cylinder 60 and 62 is fitted with a rigidly attached coil of wire, 64 and 66, respectively. A saddle-shaped spring 68 is fitted around the inner cylinder 60, just above and resting on coil 64. The inner cylinder 60 is then inserted in the outer cylinder 62 while slightly compressing the saddle-shaped spring 68. A snap ring 58 is installed in the groove near the upper end of the inner cylinder 60. The snap ring 58 maintains a slight compression of the saddle-shaped spring 68, and thus defines the null point for the focus adjustment. The coils 64 and 66 are wired in series. An electrical current applied to the coils 64 and 66 generates magnetic fields in the vicinity of the coils 64 and 66. Interaction of the magnetic fields causes the coils 64 and 66 to be drawn together against the tension of the saddle-shaped spring 68. Increasing the current applied to the coils 64 and 66 will increase the displacement of the inner cylinder 60 with respect to the fixed outer cylinder 62, thus achieving the required focusing action.

An alternative way to select the plane of a layer within the multi-layer disk 24 may be implemented by linearly displacing multi-layer disk along the axis of the spindle 40, while keeping the objective lens 22 stationary. As the multi-layer disk 24 is moved up or down along the spindle 40, the focal point of the objective lens 22 falls on different layers. Thus, the first coherent light beam 11 is focused on a particular data-bearing layer of interest within the multi-layer disk 24.

It should be noted that the discrimination of the layers along the normal to the plane of the multi-layer disk 24 requires a relatively high degree of flatness and accurate alignment of the rotational axis relative to the plane of the multi-layer disk 24. If the layers are of the order of 5 to 10 μm thick, then the flatness and accuracy of rotation would have to be kept within tolerances of roughly 2 to 4 μm. Control of rotational parameters and location of the optical assembly relative to the plane parallel to the surface of the multi-layer disk 24 can be managed by servomechanisms and control circuitry similar to those applied in conventional compact disk or laser disk technology.

As in conventional CDs, the data is read by rotating the multi-layer disk 24 in either clockwise or counterclockwise direction for scanning concentric sectors 28 of a particular layer. A drive motor 42 turns the multi-layer disk 24 on a spindle 40 in either direction.

Figure 3:
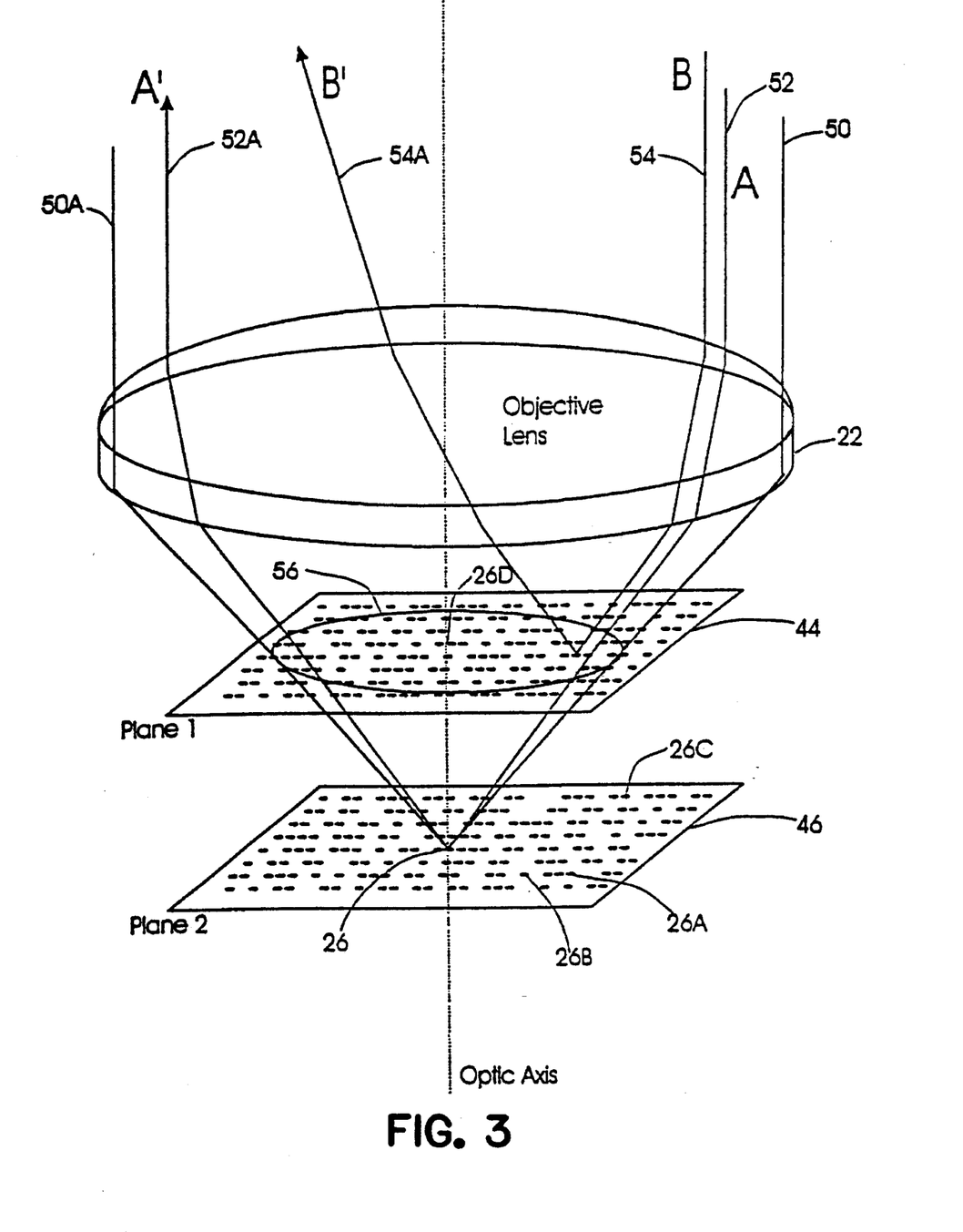
FIG. 3 illustrates an off-focus signal rejection achieved with a confocal optical microscopy system which reads data from a multi-layer data medium.
Figure 4A:
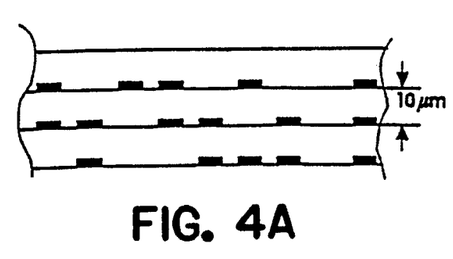
FIG. 4 illustrates the process for adding a layer of data points to the surface of a multi-layer disk 24.
Figure 4B:
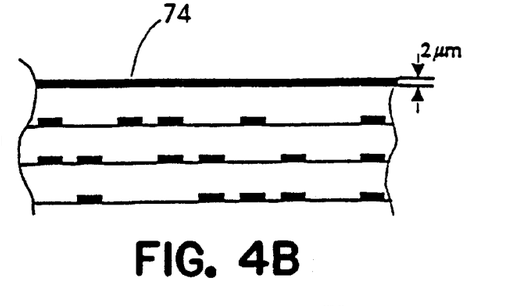
Figure 4C:
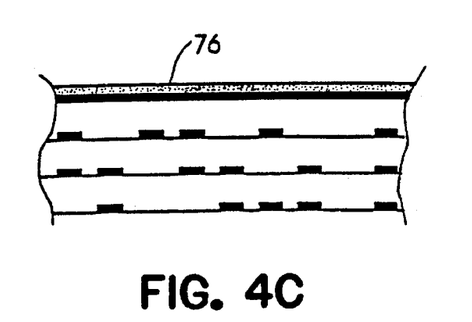
Figure 4D:
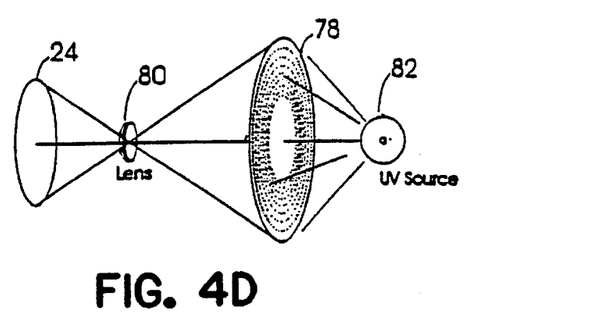
Figure 4E:
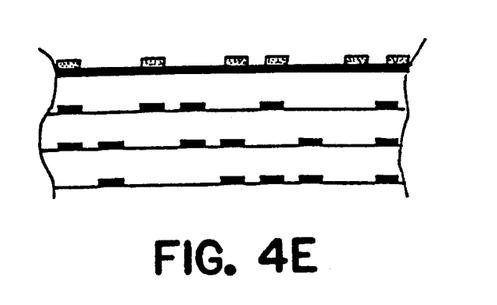
Figure 4F:
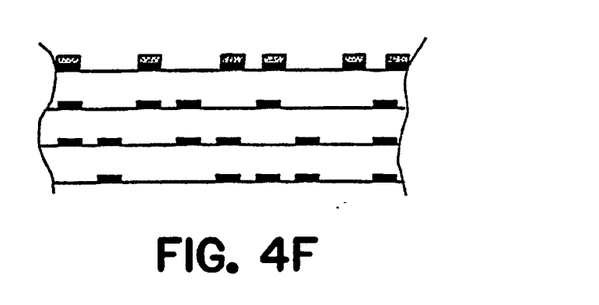
Figure 4G:
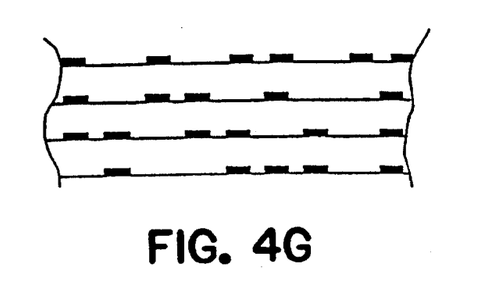
Figure 4H:
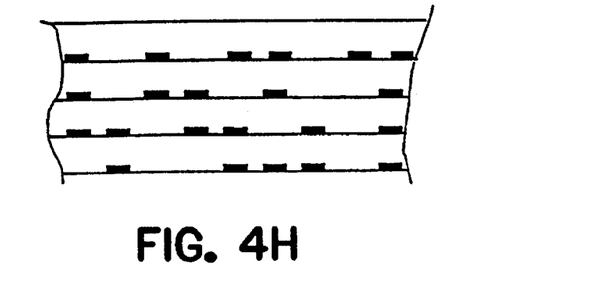

FIG. 3 illustrates an off-focus signal rejection of a confocal optical microscopy system for use with a multi-layer data medium. Two parallel planes 44 and 46 of recorded data are shown in FIG. 3. The plane 46 is on the focal plane defined by the two pinhole apertures 18 and 32 of the illuminating and imaging sections, respectively. The plane 44 is parallel to and above the plane 46. The illuminated region 56 on the plane 44 contains all of the rays incident on the plane 44. In the present example, an assumption is made that all sensing locations, such as 26, 26A, 26B and 26C, are specular reflectors of substantially opaque material. All other areas on both planes 44 and 46 are transparent.

Incident rays 50, 52 and 54 of FIG. 3 illustrate the selectivity of the confocal optical microscopy system. The incident rays 50 and 52 that pass through the transparent regions of the plane 44 converge to the focal point— at the sensing location 26— on the plane 46. Because the incident rays 50 and 52 converge on the optic axis of the objective lens 22, symmetry requires that the incident rays 50 and 52 return to the objective lens 22 via reflected rays 50A and 52A, when reflected from the sensing location 26. The reflected rays 50A and 52A then travel to the pinhole aperture 32 and eventually to the photodetector 36.

An incident ray 54 represents the rays that impinge on sensing locations other than the sensing location 26 in the plane 44. The incident ray 54 reaches a sensing location off the optic axis of the objective lens 22. Hence, symmetry does not apply to the path of the reflected ray 54A. Passing through the objective lens 22, the reflected ray 54A is refracted at an angle which places it outside the pinhole aperture 32. The reflected ray 54A is therefore screened out by the second plate 30. A cumulative effect of such off-axis rays will attenuate the overall intensity of the signal received at the photodetector 36. These rays, however, do not modulate or significantly degrade the data-bearing signal.

Statistically, the total area covered by the data-bearing sensing locations in the plane 44 is less than half of the total area of the layer. Consequently, a large ratio of the incident rays 50 and 52 to the total number of incident rays will reach the focal point on the plane 46 and reflect back in the direction that contributes to the signal detection. If a sensing location 26D on the plane 44 lies on the optical axis of the objective lens 22, the sensing location 26D may reflect an incident ray back along the direction toward the pinhole aperture 32 and the photodetector 36. The sensing location 26D, however, represents a very small area illuminated by the rays reaching or passing through the illuminated region 56 on the plane 44. By requiring the objective lens 22 to have a relatively wide aperture and a short focal length to provide a strongly convergent bundle of rays toward the focal point, the effect of the sensing location 26D on the detected signal is minuscule.

Although the disclosed confocal optical microscopy system uses a three-dimensional retrieval technique, there may be some limitations on the number and depth of layers that can be used. The maximum depth of the multi-layer disk 24 will depend upon the working distance of the objective lens 22. The maximum number of layers also depends upon optical signal attenuation by obscuring and scattering in layers above the one being read. Published results of observations made with confocal optical microscopy indicate that ten layers of data is a reasonable goal for the present approach.

The light source need not be monochromatic, but there may be advantages in using monochromatic light to avoid dispersion. If a laser is used, it must be made to diverge out of the light source 10 so that the convergence to the desired data layer occurs from a broad angle. Convergence of the illuminating rays is important to achieve the best possible rejection of unwanted signals from planes above and below the one being read. Clearly, if all the light enters along the optic axis of the objective lens 22, it can be reflected back from any layer. The strongly convergent rays, however, represent many different paths to and from the layer of interest. The sensing location 26D from a different layer will intercept and return only a very small fraction of the total bundle of rays, and will therefore provide only a comparatively very weak signal.

Conventional CDs are typically made by etching pits in a flat surface with a laser and depositing a thin film of aluminum over the finished surface to enhance the optical characteristics. In producing a multi-layer disk 24, however, it is necessary that the background medium be transparent.

Among the various possible approaches to forming the sectors of data bits is a process of building up thin layers, one at a time. For example, a method employing photoresist in a manner similar to fabrication of integrated circuits might be suitable, as illustrated in FIG. 4. The following procedure describes such a technique:

1. Fabricate a disk of a transparent material with one side flat within a variation of approximately ±1 μm.
2. Deposit a thin film (≈1 μm) of metal 74 on the flat surface.
3. Coat the metal film with photoresist 76.
4. Expose the photoresist optically to register the pattern of the recorded data from a prepared template or master 78 using a UV source 82 and a lens 80.
5. Develop to remove the photoresist from all areas except those that represent data points, as shown in step E of FIG. 4.
6. Etch to remove all except the covered metal data points.
7. Strip off remaining photoresist.
8. Deposit a new layer of transparent material 5 to 10 μm thick.
9. Return to step 2 and repeat steps 2 through 8 to produce multiple layers of recorded data.

Using the above process, one obtains the multi-layer disk 24 of multiple layers of recorded optical information. The multi-layer disk 24 includes a plurality of adjacent, parallel layers. Each layer has recorded optical information and covers a two-dimensional surface substantially equal to the surface area of the multi-layer disk 24. Each layer is made of a substantially transparent material having one surface covered by a distribution of opaque deposits of a metal film which represent the recorded optical information. Thus, achieving high resolution in discriminating among multiple layers of optically recorded data, a multifold increase in the density of the optical data storage medium is achieved in comparison with the conventional optical data storage media.

Since those skilled in the art can modify the disclosed specific embodiment without departing from the spirit of the invention, it is, therefore, intended that the claims be interpreted to cover such modifications and equivalents.

What is claimed is:

1. A confocal optical microscopy system for retrieving optical data from a multi-layer data medium of multiple layers of recorded optical data, comprising:

an illuminating means for emitting a first coherent light beam through a first pinhole aperture and focusing said first coherent light beam onto a sensing plane of a layer which contains optical information, in said multi-layer data medium;

an imaging means for focusing a second coherent light beam reflected from said sensing location of said layer in said multi-layer data medium, through a second pinhole aperture, said first and second apertures having a common optical distance to said layer, processing rays of said second coherent light beam carrying said optical information, and blocking rays in said second coherent light beam which do not originate from said sensing plane;

a detecting means for converting said second coherent light beam carrying said optical information recorded on said layer in said multi-layer data medium into an electrical signal representing binary data; and a processing means electrically coupled to said detecting means, for processing said binary data.

2. The system according to claim 1, wherein said illuminating means comprises:

an illumination source for emitting said first coherent light beam to irradiate said sensing location of said layer which contains optical information, in said multi-layer data medium;

a plurality of convex lenses spaced apart from said illumination source and disposed in a first optical path, for focusing said first coherent light beam;

a first plate spaced apart from said plurality of convex lens, having a first pinhole aperture aligned with said first optical path for diverging said first coherent light beam;

a beam-splitter prism spaced apart from said first plate, for orthogonally re-directing said first coherent light beam to distinguish reflected rays from incident rays; and an objective lens disposed in a second optical path perpendicular to said first optical path, for focusing said first coherent light beam which is orthogonally re-directed, onto said sensing location of said layer containing optical information, in said multi-layer data medium.

3. The system according to claim 1, wherein said imaging means comprises:

a beam-splitter prism disposed in a first optical path of said first coherent light beam, for orthogonally re-directing said first coherent light beam, and to distinguish said second coherent light beam from said first coherent light beam;

an objective lens disposed in a second optical path perpendicular to said first optical path, for converging said second coherent light beam reflected from said sensing position of said layer in said multi-layer data medium, to a focal point on an opposite side of said beam-splitter prism from said objective lens;

a plate spaced apart from and located on an opposite side of said beam-splitter prism from said objective lens, having said second pinhole aperture disposed at said focal point, for passing said rays of said second coherent light beam carrying optical information, which is reflected from said sensing location, and blocking the remaining rays in said second coherent light beam; and a collimator lens spaced apart from said plate and disposed in said second optical path, for shaping said second coherent light beam into one having a substantially uniform diameter over its entire length.

4. A confocal optical microscopy system for retrieving optical data from a multi-layer data medium of multiple layers of recorded optical data, comprising:

an illumination source for emitting said first coherent light beam to irradiate said sensing location of said layer which contains optical information, in said multi-layer data medium;

a plurality of convex lenses spaced apart from said illumination source and disposed in a first optical path, for converging said first coherent light beam to a first focal point;

a first plate spaced apart from said plurality of convex lens, having a first pinhole aperture located at said first focal point, for diverging said first coherent light beam;

a beam-splitter prism spaced apart from said first plate, for orthogonally re-directing said first coherent light beam to distinguish reflected rays from incident rays;

an objective lens disposed in a second optical path perpendicular to said first optical path, for focusing said first coherent light beam which is orthogonally re-directed, onto a plane containing said sensing location of said layer in said multi-layer data medium, for retrieving said optical information and converging a second coherent light beam reflected from said sensing location to a second focal point on an opposite side of said beam-splitter prism from said objective lens;

a second plate spaced apart from and located on an opposite side of said beam-splitter prism from said objective lens, having a second pinhole aperture disposed at said second focal point, for passing said rays which carry said optical information, and blocking rays within said second coherent light beam which are not reflected from said plane containing said sensing location;

a collimator lens spaced apart from said second plate and disposed in said second optical path, for shaping said second coherent light beam into one having a substantially uniform diameter over its entire length;

a photodetector spaced apart from said collimator lens and disposed in said second optical path, for converting said second coherent light beam carrying said optical information recorded on said layer in said multi-layer data medium into an electrical signal representing binary data; and a processing means electrically coupled to said detecting means, for processing said binary data.

5. The system according to claim 4, wherein a distance from said first pinhole aperture of said first coherent light beam to said sensing location is substantially equal to a distance from said second pinhole aperture of said second coherent light beam to said sensing location.

6. The system according to claim 5, further comprising a focusing collar which includes a first cylinder enclosing said objective lens for slidably displacing said objective lens inside a second cylinder along its axis to focus said first light beam onto a selected layer in said multi-layer data medium for retrieving said optical data from each plane of each layer containing sensing locations.

7. The system according to claim 5, wherein said focusing collar includes a transducer means which displaces said objective lens along an optical axis in response to an electrical signal, to retrieve optical data from each sensing location of each of said layers.

8. The system according to claim 5, further comprising a spindle for rotatably supporting said multi-layer data medium and a drive motor coupled to said spindle for rotating said multi-layer data medium to retrieve optical data from the remaining sensing locations of said layer in said multi-layer data medium.

9. The system according to claim 8, wherein said multi-layer data medium linearly moves along an axis of said spindle to focus said second light beam onto each sensing location of each of the layers in said multi-layer data medium for retrieving said optical data from each sensing location on a layer.

10. A method of retrieving optical data from a multi-layer data medium of multiple layers of recorded optical data, for use in a confocal optical microscopy retrieval system, said method comprising:

emitting a first coherent light beam through a pinhole aperture;

focusing said first coherent light beam onto a sensing location of a layer which contains optical information, in said multi-layer data medium;

converging a second coherent light beam reflected from said sensing location of said layer in said multi-layer data medium, to a focal point;

filtering said second coherent light beam at said focal point through a second pinhole aperture, said first and second aperture having a common optical distance to said layer to remove light which does not emanate from said layer;

converting said second coherent light beam into an electrical signal representing binary data; and processing said binary data.

11. A method of retrieving optical data from a multi-layer data medium of multiple layers of recorded optical data, for use in a confocal optical microscopy retrieval system, said method comprising:

(a) emitting a first coherent light beam from an illumination source to irradiate a sensing location of a layer which contains optical information, in said multi-layer data medium;

(b) converging said first coherent light beam by a plurality of convex lenses spaced apart from said illumination source and disposed in a first optical path;

(c) diverging said first coherent light beam by a first plate spaced apart from said plurality of convex lens and having a first pinhole aperture aligned with said first optical path;

(d) orthogonally re-directing said first light beam by a beam-splitter prism spaced apart from said first plate, for distinguishing reflected rays from incident rays;

(e) focusing said first coherent light beam to said sensing location of said layer by an objective lens disposed in a second optical path perpendicular to said first optical path;

(f) converging a second coherent light beam reflected from said sensing location to a focal point on an opposite side of said beam-splitter prism from said objective lens;

(g) filtering said second coherent light beam by passing rays carrying optical information, through a second pinhole aperture in a second plate, said second pinhole aperture disposed at said focal point and said second plate spaced apart from and located on an opposite side of said beam-splitter prism from said objective lens, and blocking the remaining rays;

(h) shaping said second light beam into one having a substantially uniform diameter over its entire length by a collimator lens spaced apart from said second plate and disposed in said second optical path;

(i) converting said second light beam carrying said optical information, into an electrical signal representing binary data by a photodetector spaced apart from said collimator lens and disposed in said second optical path; and (j) processing said binary data by a processing means electrically coupled with said photodetector.

12. The method according to claim 11, further comprising slidably displacing said objective lens inside a focusing collar along its axis, which encloses said objective lens coaxially disposed inside said focusing collar to focus said first light beam onto each of the sensing locations of each of the layers in said multi-layer data medium for retrieving said optical information from each of said sensing locations.

13. The method according to claim 11, further comprising linearly moving said multi-layer data medium along an axis of said spindle to focus said second light beam onto each of the remaining sensing locations of each of the remaining layers in said multi-layer data medium for retrieving said optical information from each of said remaining sensing locations.

* * * * *